Figure 1:
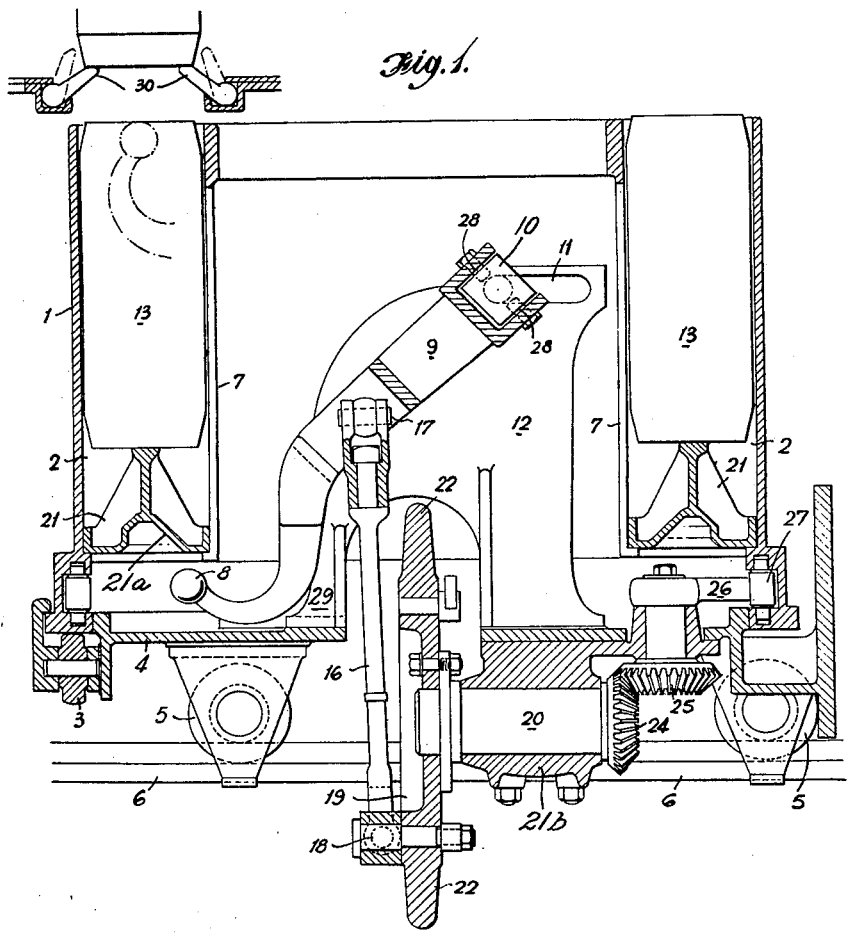

INVENTOR
DAVID REGINALD DAVIES
Norris + Bateman
ATTORNEYS

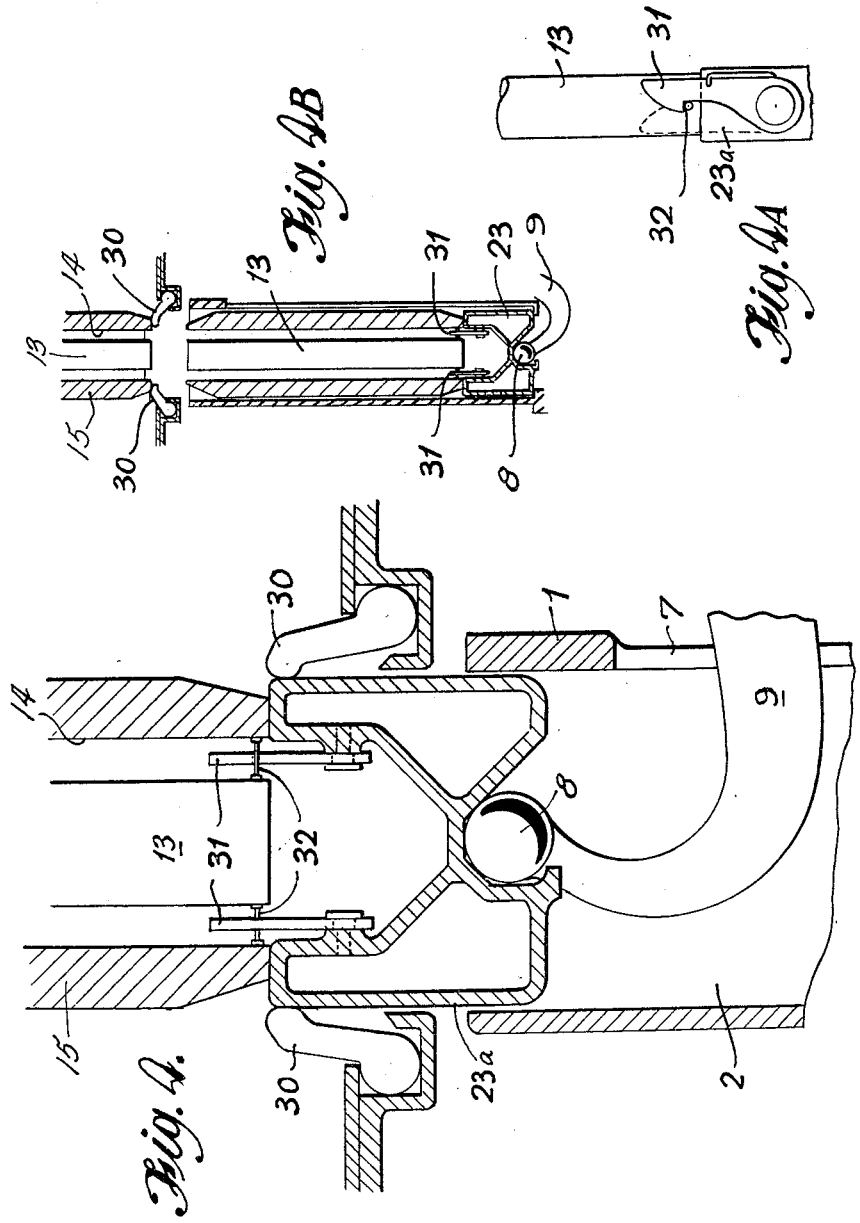

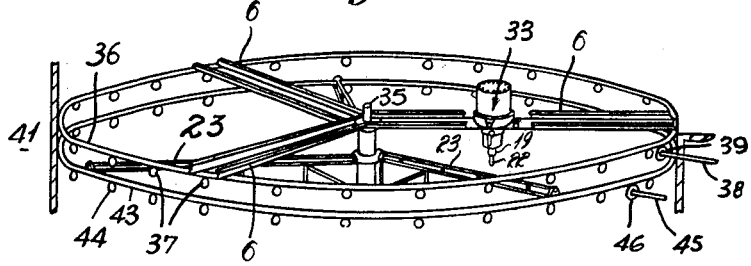
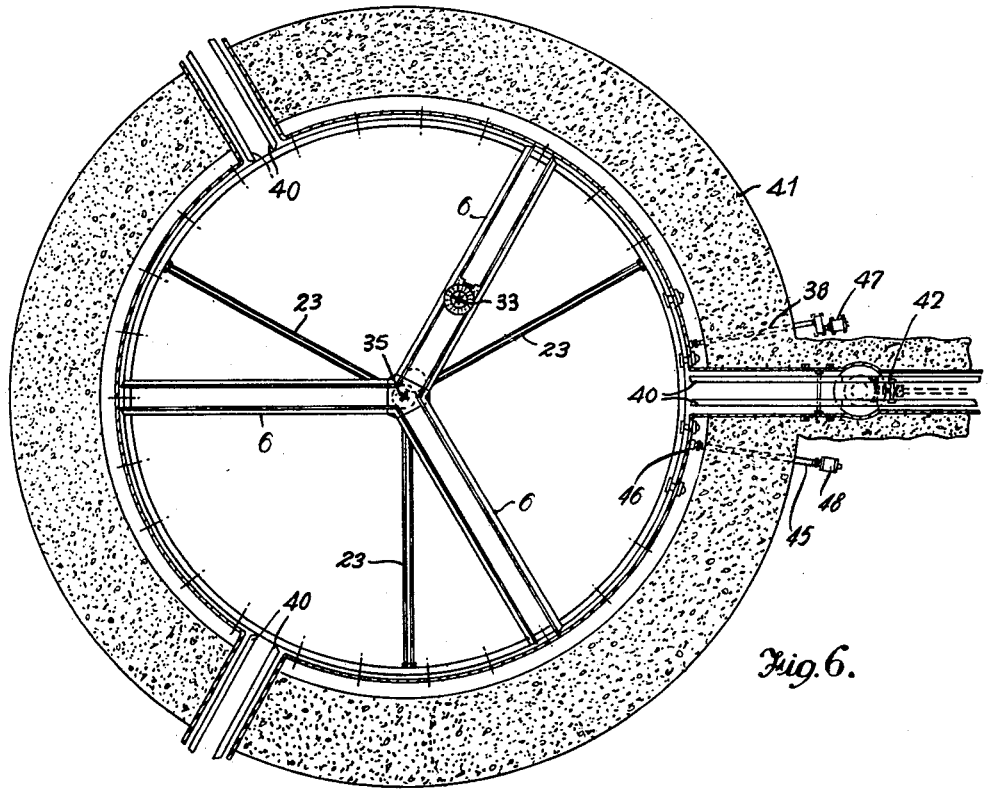

United States Patent Office 3,071,529
Patented Jan. 1, 1963

3,071,529
MECHANICAL HANDLING APPARATUS FOR LOADING AND UNLOADING HETEROGENEOUS NUCLEAR REACTORS
David R. Davies, Sale, England, assignor to Associated Electrical Industries (Manchester) Limited, a British company
Filed Aug. 3, 1959, Ser. No. 831,433
Claims priority, application Great Britain Sept. 12, 1956
5 Claims. (Cl. 204—193.2)

This invention relates to loading and unloading apparatus for nuclear reactors and more particularly to heterogeneous reactors of the kind in which the fuel is in the form of rod type elements arranged in vertical passages in the core.

This application is a continuation-in-part of my copending application Serial No. 683,082, filed September 10, 1957, now abandoned. Such heterogeneous reactors conventionally have a number of fuel channels distributed over the core most of which channels are filled with fuel elements. Each of the channels which is so filled is provided with a number of short rods, e.g. a dozen rods, stacked end to end in the channel. Usually these are uranium rods encased in aluminum.

When the used fuel elements are replaced by fresh fuel elements it is necessary to unload the fuel rods one by one from a fuel channel and then load fresh fuel rods one by one into the channel which has just been emptied.

The main object of the invention is to provide a novel loading and unloading apparatus suitable for this purpose.

The present invention comprises a fuel carrier adapted to be placed underneath a fuel channel in a reactor which carrier includes a magazine rotatable about a vertical axis and provided with supports for fuel rods positioned on a pitch circle about said axis, means for rotating the magazine step by step so that each fuel support is in turn positioned in vertical alignment with the same fuel channel and means for transferring fuel elements from the carrier to the fuel channel or from the fuel channel to the carrier.

Preferably the fuel carrier is provided with a pivoted loading arm which can be actuated to project through slots in the radial inner side of the fuel carriers so as to extend underneath a fuel element so as to lift or lower the fuel element as the case may be. The operation of this loading arm may be controlled jointly with the step by step rotation of the fuel carrier so that the loading or unloading action alternates with the rotation of the fuel carrier.

For loading the fuel carrier is charged with fuel elements outside of the reactor and then is moved into the reactor and positioned underneath the core in alignment with the fuel channel to be filled.

Similarly during unloading the fuel carrier is charged with the hot fuel elements from a fuel channel and then removed from underneath the core.

The apparatus for positioning the fuel carrier underneath the core and for effecting loading and unloading may be of the kind described and claimed in my copending application Serial No. 683,081, filed September 10, 1957, for Mechanical Handling Devices.

Figure 2:
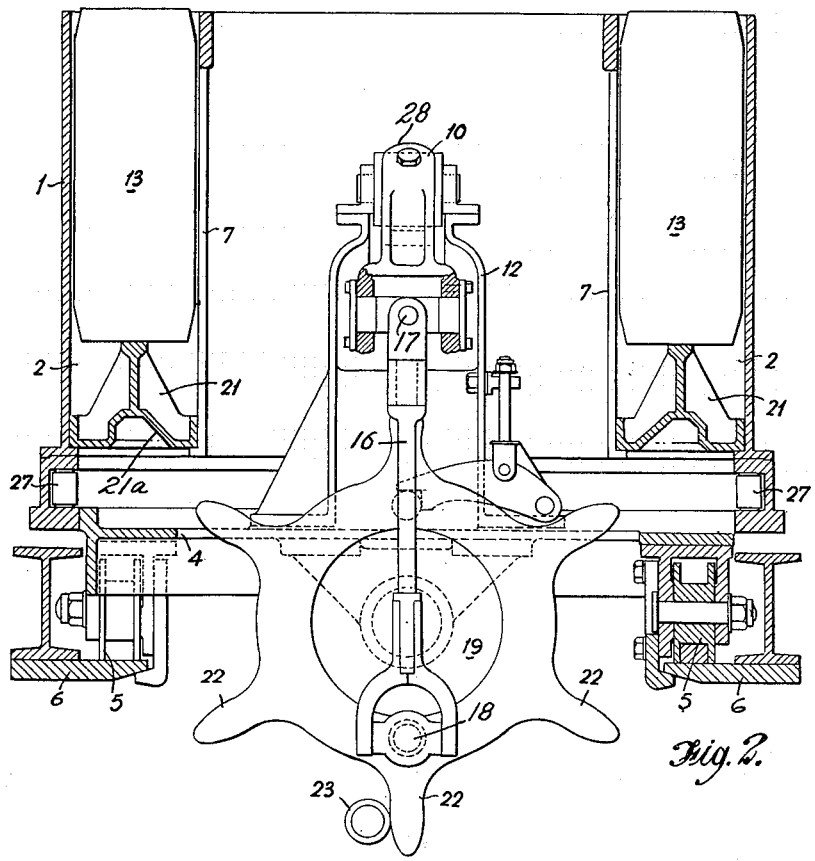
Figure 3:
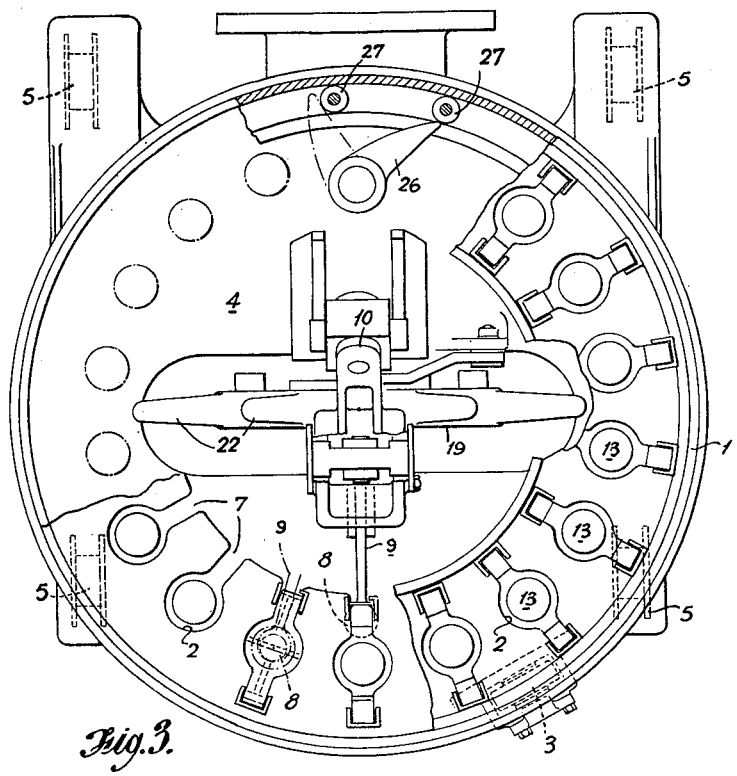

In order that the invention may be more clearly understood reference will now be made to the accompanying drawings in which:

FIG. 1 is a side elevation of one form of apparatus embodying the invention.
FIG. 2 is an end elevation.
FIG. 3 is a plan view whilst
FIGS. 4, 4A and 4B show how the apparatus above described may be modified for unloading.
FIG. 5 is a pictorial view and FIG. 6 a plan view of apparatus which may be used for positioning and actuating the fuel carrier.

The fuel carrier apparatus of FIGURES 1 and 2 essentially comprises a magazine formed by a vertical cylindrical structure 1 having a number of vertical passages 2 constituting supports for housing the fuel elements. The structure 1 rests on a series of rollers 3 mounted on a base structure 4 which in turn rests on rollers 5 running on rails 6 which are themselves movable about a central pivot axis as will be described below in connection with FIGURES 5 and 6.

The fuel carrier apparatus may be located by positioning the carrier apparatus on the rails and by positioning the rails as will be described later. The fuel supports 2 are arranged on a pitch circle about the axis of rotation of the magazine 1 and each, as above mentioned, is tubular and is formed on the inside with a vertical slot 7 through which the nose 8 of the loading arm 9 projects radially outwards. This loading arm is pivoted about a bearing block 10 which is slidable in a slot 11 mounted on the top of a bracket 12.

In FIG. 1 the loading arm is shown in the lowered position and it can be raised into the position shown in chain dotted lines; it is adapted to lift a fuel element 13 from a support passage 2 into the passage 14 in the reactor core 15 underneath which the fuel carrier is located. The pivotal movement of the loading arm 9 is effected through a connecting rod 16 which is pivoted by a pin 17 extending between the side flanges of the loading arm and at 18 the rod 16 is pivoted eccentrically to a control wheel 19. This control wheel 19 is fixed on a shaft 20 supported in a housing 21b and is formed with uniformly spaced radial spokes 22. These spokes are moved by driving arms 23 (see FIGURES 2, 5 and 6) located beneath the fuel carrier. The driving arms may, for example, be rotated about the vertical axis 35 of the core, as will be described later.

Referring again to FIGURES 1, 2 and 3, each time the control wheel 19 is moved by a driving arm 23 wheel 19 is rotated through 60° and the loading arm 9 is moved in a vertical direction a corresponding amount about its pivot axis in bearing block 10. It will be noted that there are six spokes 22 so that when all six spokes have been moved in sequence the wheel 19 will have made a complete rotation and the loading arm will have performed one cycle of up and down movement.

At the same time the shaft 20 to which the wheel 19 is secured operates through bevel gears 24, 25 on an arm 26 which rotates about a vertical axis and in so doing abuts against a series of rollers 27 best shown in FIGURE 3 which are distributed around the periphery of the base of the structure 1 and this serves as an indexing means to rotate the structure a unit amount determined by the distance between adjacent rollers 27 each time the control wheel 19 makes one complete revolution thereby producing a step by step rotational movement of the structure so as to bring the next fuel support in alignment with the fuel channel 14 in the reactor core. Clearly the arm 26 will be so positioned that the rotational movement of the structure occurs during the last part of the movement of the control wheel 19. Thus the rotational movement alternates with the loading and unloading operations.

It will be appreciated that provision must be made for the fact that the rotational movement of the magazine will occur before the loading arm has fully completed its cycle of movement, and while arm 9 is still extended in slot 7 in one of the cylindrical structures 1. To permit this to occur, arm 9 is pivoted to the bearing block 10 by trunnions 28 which allow a certain amount of sideway rocking of the arm 9; at the same time a cam surface 29 deflects the nose 8 of the arm 9 sideways during the last part of its downward movement after it has passed below cylindrical structure 1 so that when it finally comes to rest it will be positioned underneath the next fuel rod to be raised.

There are a number of fuel elements in alignment and at the bottom of the stack there would normally be several dummy elements, i.e. in the part of the approach channel which passes through the supporting structure for the core.

When the fuel elements are raised into the core channel 14 they are prevented from falling down by pawls 30 and thus they can be inserted one at a time, each element inserted pushing up the others. During a loading operation the nose 8 of the loading arm abuts against the underside of a piston 21 which moves up the passage 14 and lifts the fuel element.

The underside of the piston is formed with a recess 21a into which the nose 8 of the loading arm fits.

During unloading, piston 21 is replaced by the piston 23a, as shown in FIG. 4. This, when raised, pushes the pawls 30 apart. At the same time the piston is provided with pawls 31 which latch on to bars 32 fixed to the fuel element so that when the piston is lowered, the fuel element is pulled down.

FIG. 4B shows the conditions after a fuel element has been lowered into the fuel carrier and shows the next fuel element 13 in the core fuel channel 14 held up by the pawls 30.

FIGS. 5 and 6 show apparatus which may be employed for positioning and actuating the fuel carrier.

In the drawings the fuel carrier apparatus which may be the same as shown in FIGURE 1 is indicated generally by the reference 33. This rests on rails 6, of which there are three sets, extending from a central pivot 35. The rails 6 in the region of the fuel carrier apparatus 33 are shown broken away in FIGURE 5 so as not to obscure the fuel carrier apparatus. The outside ends of the rails are secured to annular members 36 which rest on rollers 37 and the whole assembly is rotatable by means of a shaft 38 and pinion 39 engaging the annular member 36.

As best shown in FIG. 6, each of the rails can be aligned with fixed rails 40 by which the fuel carrier can be inserted or removed through the wall 41 of the reactor. A ram 42 pushes the fuel carrier on to the appropriate set of rails 6 and positions it radially; the rails 6 are then rotated to position it angularly by motor 47 driving shaft 38.

Actuation of the spokes 22 (FIGS. 1, 2 and 5) is effected by the arms 23 which extend radially from the same pivot point 35 as the rail 6. The outer ends of arms 23 are connected to annular ring 43 and supported on rollers 44. Arms 23 and ring 43 form a structure which may be rotated by motor 48 driving shaft 45 and pinion 46.

For a fuller description of the apparatus shown in FIGS. 5 and 6, reference may be made to my co-pending application Serial No. 683,081 wherein the positioning apparatus is claimed and described in greater detail.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a nuclear reactor having a vertically channeled core, a fuel element carrier adapted to be located underneath the core for transferring fuel elements between said vertical fuel channels and said carrier, which carrier comprises a magazine rotatable about a vertical axis, supports for fuel elements positioned on a pitch circle about said vertical axis, means for rotating the magazine step by step about said axis so that each fuel support is in turn positioned in vertical alignment with the same fuel channel and means for moving fuel elements vertically through the fuel rod supports up through said channels, said means comprising a pivoted loading arm on said carrier having a part adapted for projecting through slots in the radial inner sides of the fuel supports so as to extend underneath the fuel elements therein and means for operating the loading arm synchronously with a step by step rotation of the fuel carrier magazine so that fuel element loading and unloading actions are effected essentially mainly between periods of rotation of the fuel carrier magazine, said loading arm operating means comprising a link coupling the loading arm with a concentric pivot on a rotatable control wheel, a motion transmitting coupling between said control wheel and magazine rotating apparatus and peripheral actuation spokes on said control wheel.

2. In a nuclear reactor having a vertically channeled core, a fuel element carrier adapted to be located underneath the core for transferring fuel elements between vertical fuel channels through the pile and said carrier, which carrier comprises a magazine rotatable about a vertical axis, supports for fuel elements positioned on a pitch circle about said vertical axis, means for rotating the magazine step by step about said axis so that each fuel support is in turn positioned in vertical alignment with the same fuel channel and means for moving fuel elements vertically through the fuel supports up into said channels, said fuel element means comprising a pivoted loading arm having a part adapted for projecting through slots in the radial inner sides of the fuel supports so as to extend underneath the fuel elements therein and means for operating the loading arm synchronously with step by step rotation of the fuel carrier magazine so that fuel element loading and unloading actions are effected essentially mainly between periods of rotation of the fuel carrier magazine and means for shifting the loading arm laterally when it is substantially at the lower end of its travel so as to position it effectively beneath the next fuel support in the magazine.

3. A fuel element carrier for a nuclear reactor comprising a magazine mounted for rotation about a vertical axis and having a plurality of vertical upwardly open fuel element support passages disposed in circumferentially spaced relation, a vertically slidable support in each of said passages adapted to support at least one fuel element thereabove, means for rotating said magazine about its axis to locate each one of said support passages in succession in a fuel element transfer position where it is aligned with a reactor core channel thereabove, a loading arm swiveled on the carrier and adapted for selective movement into operative engagement with the support at said transfer station, and means for actuating said loading arm to swing it into engagement with said support at said transfer station and slidably displace the support in its passage.

4. In the carrier defined in claim 3, said supports being removable and replaceable pistons slidable in said passages.

5. In the carrier defined in claim 3, said means for rotating the magazine comprising means for intermittently rotating said magazine for successively locating each said passage at said transfer station, and mechanism synchronizing said means for rotating the magazine with said means for actuating said loading arm so that said arm is engaged with one of said supports substantially only when the magazine is not being rotated.

References Cited in the file of this patent

UNITED STATES PATENTS

| | | |
|---|---|---|
| 519,949 | Hansen | May 15, 1894 |
| 535,752 | Doughty | Mar. 12, 1895 |
| 2,756,858 | Kasschau | July 31, 1956 |
| 2,780,596 | Anderson | Feb. 5, 1957 |
| 2,863,815 | Moore et al. | Dec. 9, 1958 |

OTHER REFERENCES

McLain: First Nuclear Engineering and Science Conference, Cleveland, Ohio, "Problems in Nuclear Engineering," vol. I, Permagon Press, pages 267–276 (1955).